(12) United States Patent
Shi

(10) Patent No.: US 11,803,078 B2
(45) Date of Patent: Oct. 31, 2023

(54) DISPLAY PANEL AND DISPLAY DEVICE

(71) Applicant: Shenzhen China Star Optoelectronics Semiconductor Display Technology Co., Ltd., Guangdong (CN)

(72) Inventor: Zhiqing Shi, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 570 days.

(21) Appl. No.: 16/975,711

(22) PCT Filed: Jun. 5, 2020

(86) PCT No.: PCT/CN2020/094665
§ 371 (c)(1),
(2) Date: Aug. 26, 2020

(87) PCT Pub. No.: WO2021/227160
PCT Pub. Date: Nov. 18, 2021

(65) Prior Publication Data
US 2023/0097202 A1 Mar. 30, 2023

(30) Foreign Application Priority Data
May 13, 2020 (CN) .......................... 202010401487.X

(51) Int. Cl.
G02F 1/1335 (2006.01)
G02F 1/1362 (2006.01)
G02F 1/1334 (2006.01)

(52) U.S. Cl.
CPC .... *G02F 1/133514* (2013.01); *G02F 1/13345* (2021.01); *G02F 1/133512* (2013.01); *G02F 1/136286* (2013.01)

(58) Field of Classification Search
CPC ..................... G02F 1/133514; G02F 1/133512
See application file for complete search history.

(56) References Cited

U.S. PATENT DOCUMENTS

2013/0201429 A1\* 8/2013 Xu ........................ G02F 1/1368
349/95
2015/0185556 A1 7/2015 Arai et al.
2015/0192825 A1\* 7/2015 Yang ................. G02F 1/133516
445/25

(Continued)

FOREIGN PATENT DOCUMENTS

CN 106324893 1/2017
CN 206115085 4/2017
(Continued)

*Primary Examiner* — Jonathan Y Jung

(57) ABSTRACT

The present disclosure provides a display panel and a display device, including an array substrate; and a color filter substrate disposed opposite to the array substrate, wherein a color filter layer is disposed on a side of the color filter substrate facing the array substrate, and the color filter layer comprises a plurality of first black color resist blocks arranged at intervals and a plurality of color resist blocks disposed between two adjacent first black color resist blocks, wherein heights of each of the plurality of first black color resist blocks is greater than heights of each of the plurality of color resist blocks.

14 Claims, 2 Drawing Sheets

(56) References Cited

U.S. PATENT DOCUMENTS

| | | | |
|---|---|---|---|
| 2016/0086044 A1* | 3/2016 | Yu ..................... | G06V 40/1318 |
| | | | 250/226 |
| 2018/0031883 A1 | 2/2018 | Li et al. | |
| 2018/0143473 A1* | 5/2018 | Yamazaki ......... | G02F 1/133514 |
| 2022/0171233 A1* | 6/2022 | Chang ................ | G02F 1/13398 |

FOREIGN PATENT DOCUMENTS

| | | |
|---|---|---|
| CN | 104620169 | 5/2017 |
| CN | 206162021 | 5/2017 |
| CN | 105404047 | 5/2018 |
| CN | 108807490 | 11/2018 |
| CN | 110596937 | 12/2019 |
| CN | 110673366 | 1/2020 |
| CN | 110718644 | 1/2020 |
| CN | 110928031 | 3/2020 |
| WO | WO 2014/015629 | 1/2014 |

\* cited by examiner

DISPLAY PANEL AND DISPLAY DEVICE

RELATED APPLICATIONS

This application is a National Phase of PCT Patent Application No. PCT/CN2020/094665 having International filing date of Jun. 5, 2020, which claims the benefit of priority of Chinese Patent Application No. 202010401487.X filed on May 13, 2020. The contents of the above applications are all incorporated by reference as if fully set forth herein in their entirety.

FIELD AND BACKGROUND OF THE INVENTION

The present disclosure relates to the field of display technology, and more particularly to a display panel and a display device.

With rapid development of display technology, display devices with transparent display capabilities have recently begun to attract the attention of researchers, wherein a transparent display refers to a display device that can provide a transparent display state so that viewers can see what is behind the display panel. Commonly, the transparent displays are used in display windows, vending machines, or other functions that are required to present a display screen overlaid in front of physical items on display. The transparent displays are also used in miniaturized display devices and glass. It is difficult to transmit light through liquid crystal displays (LCDs), because LCDs contain polarizers, thereby it is difficult for a light transmittance rate of an LCD transparent display to reach a very high level.

Currently, the transparent display adopts polymer network liquid crystals (PNLCs), so the transparent display can remove the polarizer, and thereby improving the transmittance rate of the transparent display to a large extent, but new problems also arise at the same time, as due to a scattered light mode of the PNLC, a contrast and a color gamut of PNLC transparent displays are low.

Embodiments of the present disclosure provide a display panel and a display device which solve a technical problems of scattered light generation, and that the scattered light enters adjacent pixels, causing the contrast and the color gamut of the display panel to be low when adopting polymer network liquid crystals in the prior art.

SUMMARY OF THE INVENTION

In order to solve the above technical problems, embodiments of the present disclosure provides a display panel, including an array substrate; and a color filter substrate disposed opposite to the array substrate, wherein a color filter layer is disposed on a side of the color filter substrate facing the array substrate, and the color filter layer comprises a plurality of first black color resist blocks arranged at intervals and a plurality of color resist blocks disposed between two adjacent first black color resist blocks, wherein heights of each of the plurality of first black color resist blocks is greater than heights of each of the plurality of color resist blocks.

In one embodiment of the present disclosure, heights of each of the plurality of first black color resist blocks are further greater than or equal to 6 microns.

In one embodiment of the present disclosure, heights of each of the plurality of first black color resist blocks are further less than or equal to 20 microns.

In one embodiment of the present disclosure, each of the plurality of color resist blocks is independently selected from one of a red color resist block, a green color resist block, a blue color resist block, and a white color resist block.

In one embodiment of the present disclosure, a plurality of second black color resist blocks are disposed on a side of the array substrate facing the color filter substrate, and the plurality of second black color resist blocks and the plurality of first black color resist blocks in a one-to-one correspondence.

In one embodiment of the present disclosure, each of the plurality of second black color resist blocks has an interval from the corresponding first black color resist block.

In one embodiment of the present disclosure, the array substrate is provided with a plurality of gate lines and a plurality of data lines cross to each other, the plurality of gate lines and the plurality of data lines defining a plurality of sub-pixel regions arranged in an array, each of the plurality of sub-pixel regions is provided with a pixel electrode and a photosensitive sensor, and two terminals of the photosensitive sensor are respectively connected to a scanning line and the pixel electrode.

In one embodiment of the present disclosure, a liquid crystal layer is further provided between the array substrate and the color filter substrate, and wherein the liquid crystal in the liquid crystal layer comprises a polymer network liquid crystal.

In one embodiment of the present disclosure, the color filter substrate is further provided with a protective layer on a side facing the color filter layer, and the protective layer covers the color filter layer.

According to the above object of the present disclosure, there is provided a display device including a display panel and a backlight module provided on one side of the display panel, the display panel includes an array substrate; and a color filter substrate disposed opposite to the array substrate, wherein a color filter layer is disposed on a side of the color filter substrate facing the array substrate, and the color filter layer comprises a plurality of first black color resist blocks arranged at intervals and a plurality of color resist blocks disposed between two adjacent first black color resist blocks, wherein heights of each of the plurality of first black color resist blocks is greater than heights of each of the plurality of color resist blocks.

In one embodiment of the present disclosure, heights of each of the plurality of first black color resist blocks are further greater than or equal to 6 microns.

In one embodiment of the present disclosure, heights of each of the plurality of first black color resist blocks are further less than or equal to 20 microns.

In one embodiment of the present disclosure, each of the plurality of color resist blocks is independently selected from one of a red color resist block, a green color resist block, a blue color resist block, and a white color resist block.

In one embodiment of the present disclosure, a plurality of second black color resist blocks are disposed on a side of the array substrate facing the color filter substrate, and the plurality of second black color resist blocks and the plurality of first black color resist blocks in a one-to-one correspondence.

In one embodiment of the present disclosure, each of the plurality of second black color resist blocks has an interval from the corresponding first black color resist block.

In one embodiment of the present disclosure, the array substrate is provided with a plurality of gate lines and a plurality of data lines cross to each other, the plurality of gate lines and the plurality of data lines defining a plurality of sub-pixel regions arranged in an array, each of the plurality of sub-pixel regions is provided with a pixel electrode and a photosensitive sensor, and two terminals of the photosensitive sensor are respectively connected to a scanning line and the pixel electrode.

In one embodiment of the present disclosure, a liquid crystal layer is further provided between the array substrate and the color filter substrate, and wherein the liquid crystal in the liquid crystal layer comprises a polymer network liquid crystal.

In one embodiment of the present disclosure, the color filter substrate is further provided with a protective layer on a side facing the color filter layer, and the protective layer covers the color filter layer.

Compared with the prior art, the present disclosure increases the heights of the plurality of first black color resist block to block and absorb the scattered light in the liquid crystal layer, and reduces the scattered light enter the adjacent color resist block, thereby improving the affect of scattered light on adjacent pixels, and thus reducing a difference between the transmittance rate of adjacent pixels and the theoretical value, so as to achieve the purpose of improving the contrast and the color gamut of the display panel.

BRIEF DESCRIPTION OF THE SEVERAL VIEWS OF THE DRAWINGS

The technical solution and other beneficial effects of the present disclosure will be apparent through the detailed description of the specific implementation and the accompanying figures.

DESCRIPTION OF SPECIFIC EMBODIMENTS OF THE INVENTION

Figure 1:
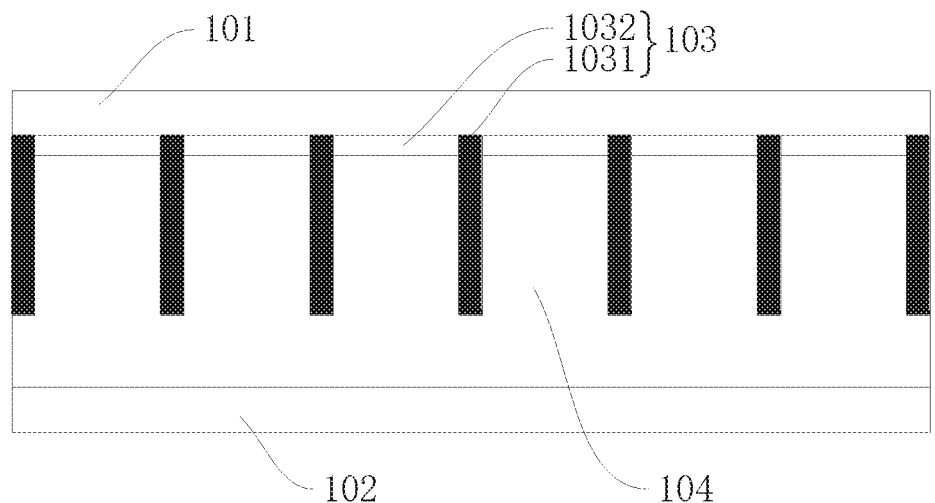
FIG. 1 is a schematic structural diagram of a display panel provided by one embodiment of the present disclosure.

In the following, the technical solutions in the embodiments of the present disclosure will be clearly and completely described with reference to the figures. Obviously, the described embodiments are only some embodiments of the present disclosure, not all the embodiments. Based on the embodiments in the present disclosure, all other embodiments obtained by a person of ordinary skill in the art without creative steps shall fall within the protection scope of the present disclosure.

In the description of the present disclosure, it should be understood that the terms of center, longitudinal, transverse, length, width, thickness, upper, lower, front, rear, left, right, vertical, horizontal, top, bottom, inside, outside, clockwise, counterclockwise, etc. or a positional relationship based on orientation or position shown in the figures are only for the convenience of describing the present disclosure and simplifying the description, rather than indicating or implying the device or element referred to must have a specific orientation, structure, or operation. Therefore, it cannot be understood as a limitation of the present disclosure. In addition, the terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present disclosure, the meaning of "a plurality" is two or more, unless otherwise specifically limited.

In the description of the present disclosure, it should be noted that, unless otherwise clearly specified and limited, the terms "install", "link", and "connect" should be understood in a broad sense, for example, it can be fixed connection or detachable connection, or integrally connection; may be mechanical connection, electrical connection, or may be signal connect with each other; which may be directly connected, or may be indirectly connected through an intermediary, may be a connection between two elements or the interaction relationship of two elements. Those of ordinary skill in the art can understand the specific meanings of the above terms in the present disclosure according to specific situations.

In the present disclosure, unless otherwise clearly specified and defined, the first feature "above" or "below" the second feature may include a direct contact between the first feature and second feature, or may include the first feature and second feature not contact directly but through another feature between them. Moreover, the first feature is "above", "on" or "upon" the second feature includes that the first feature is directly above and obliquely above the second feature, or simply means that a horizontal level of the first feature is higher than a horizontal level of the second feature. The first feature is "below", "under" and "underneath" the second feature includes that the first feature is directly below and obliquely below the second feature, or simply means that a horizontal level of the first feature is less than a horizontal level of the second feature.

The following disclosure provides many different implementations or examples for implementing different structures of the present disclosure. In order to simplify the disclosure of the present disclosure, the components and settings of specific examples are described below. Of course, they are only examples, and the purpose is not to limit the present disclosure. In addition, the present disclosure may repeat reference numerals and/or reference letters in different embodiments. Such repetition is for the purpose of simplicity and clarity, and does not itself indicate the relationship between the various embodiments and/or settings discussed. In addition, the present disclosure provides examples of various specific processes and materials, but those of ordinary skill in the art may be aware of the application of other processes and/or the use of other materials.

The present disclosure is directed to solve the technical problems of scattered light generation, and that the scattered light enters adjacent pixels, causing the contrast and the color gamut of the display panel to drop when adopting polymer network liquid crystals in current display panels.

In order to solve the above technical problems, embodiments of the present disclosure provides a display panel and a display device. The display panel includes an array substrate and a color filter substrate disposed opposite to the array substrate; wherein a color filter layer is disposed on a side of the color filter substrate facing the array substrate, the color filter layer comprises a plurality of first black color resist blocks arranged at intervals and a plurality of color resist blocks disposed between two adjacent first black color resist blocks, wherein a height of each of the plurality of first black color resist blocks is greater than a height of each of the plurality of color resist blocks.

Specifically, as shown in FIG. 1, the display panel including an array substrate 102, and a color filter substrate 101 disposed opposite to the array substrate 102, wherein a color filter layer 103 is disposed on a side of the color filter substrate 101 facing the array substrate 102.

The color filter layer 103 includes a plurality of first black color resist blocks 1031 arranged at intervals and a plurality of color resist blocks 1032 disposed between two adjacent first black color resist blocks 1031, wherein a height of each of the plurality of first black color resist blocks 1031 is greater than a height of each of the plurality of color resist blocks 1032.

Figure 3:
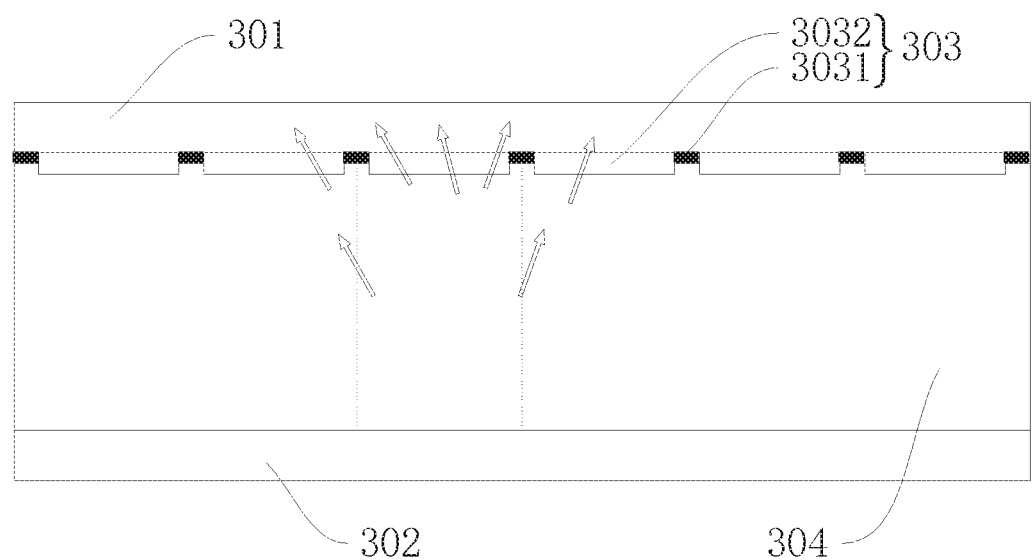
FIG. 3 is a schematic structural diagram of a current display panel.

Please refer to FIG. 3, during the implementation and application process, a current display panel includes a color filter substrate 301 and an array substrate 302 oppositely disposed, and a liquid crystal layer 304 disposed between the color filter substrate 301 and the array substrate 302. Since the polymer network liquid crystal is used in the liquid crystal layer 304, scattered light is generated, and since heights of the plurality of black color resist blocks 3031 in the color filter layer 303 are lower and lesser than the heights of the plurality of color resist block 3032, the scattered light easily enters the adjacent pixels, and easily affects the adjacent pixels, making a light transmittance rate of the adjacent pixels uncontrollable, and further lowers the contrast of the display panel. The display panel provided in the present disclosure increases the heights of the plurality of the black color resist blocks 1031 to block and absorb the scattered light, effectively reducing the influence of the scattered light on the adjacent pixels and a difference between a theoretical light transmittance value and an actual transmittance value, thereby resulting in improving the contrast and color gamut of the display panel.

Further, in one embodiment of the present disclosure, as shown in FIG. 1.

A liquid crystal layer 104 is further provided between the array substrate 102 and the color filter substrate 101, and wherein the liquid crystal in the liquid crystal layer 104 comprises a polymer network liquid crystal.

In this embodiment, the height of each of the plurality of black color resist blocks 1031 are greater than or equal to 6 microns. Preferably, heights of each of the plurality of black color resist blocks 1031 are less than or equal to 20 microns. It should be noted that, because the liquid crystal layer 104 is a scattering-type liquid crystal layer, and the thickness of the scattering-type liquid crystal layer varies according to the characteristics of the liquid crystal material. To be more precisely, the thinner the scattering type liquid crystal layer, the better the light transmission, but the lower the contrast; the thicker the scattering type liquid crystal layer, the worse the light transmittance rate, but the higher the contrast. Therefore, according to the thickness of the liquid crystal layer 104, heights of the black color resist blocks 1031 are set to be between 6 μm and 20 μm, so as to coordinate the transmittance rate and contrast of the display panel, and can thereby improve the contrast of the display panel while ensuring light transmittance rate.

In this embodiment, each of the plurality of color resist blocks 1032 is independently selected from one of a red color resist block, a green color resist block, a blue color resist block, and a white color resist block.

It should be noted that the above display panel only shows the array substrate 102 and the color filter substrate 101, these structural layers are only a brief description of the partial structure and components of the display panel, but not limited to this. For example, the array substrate 102 includes TFT switches, scan lines, data lines, pixel electrodes, and common electrodes. The display panel also includes various other display components, such as there are alignment films and frame glue disposed between the color filter substrates 101 and the array substrate 102, these details can be implemented with reference to the currently technologies, and will not be repeated here.

Specifically, in this embodiment, the array substrate 102 is provided with a plurality of gate lines and a plurality of data lines that cross each other, the plurality of gate lines and the plurality of data lines defining a plurality of sub-pixel regions arranged in an array, each of the plurality of sub-pixel regions is provided with a pixel electrode and a photosensitive sensor, and two terminals of the photosensitive sensor are respectively connected to a scanning line and the pixel electrode. A photosensitive sensor is provided in the sub-pixel area to control the transmittance rate of specific pixels when the display panel is becomes transparent, so that objects behind the display are clearer, and further enhances the effect of displaying objects in the transparent display.

In this embodiment, a side of the color filter substrate 101 facing the color filter layer 103 may further be provided with a protective layer (not shown in the figure) to protect the plurality of black color resists 1031 and the plurality of color resist blocks 1032 in the color filter layer 103, to improve the stability of the display panel, and increase the service life of the display panel, wherein a material of the protective layer may be a transparent photoresist material.

In summary, by increasing the heights of the plurality of first black color resist block to block and absorb the scattered light in the liquid crystal layer, it is possible to reduce the scattered light entering the adjacent color resist block, thereby reducing the influence of scattered light on adjacent pixels, thus reducing the difference between the actual and theoretical light transmittance values of adjacent pixels, so as to achieve the purpose of improving the contrast and the color gamut of the display panel in this embodiment.

Figure 2:
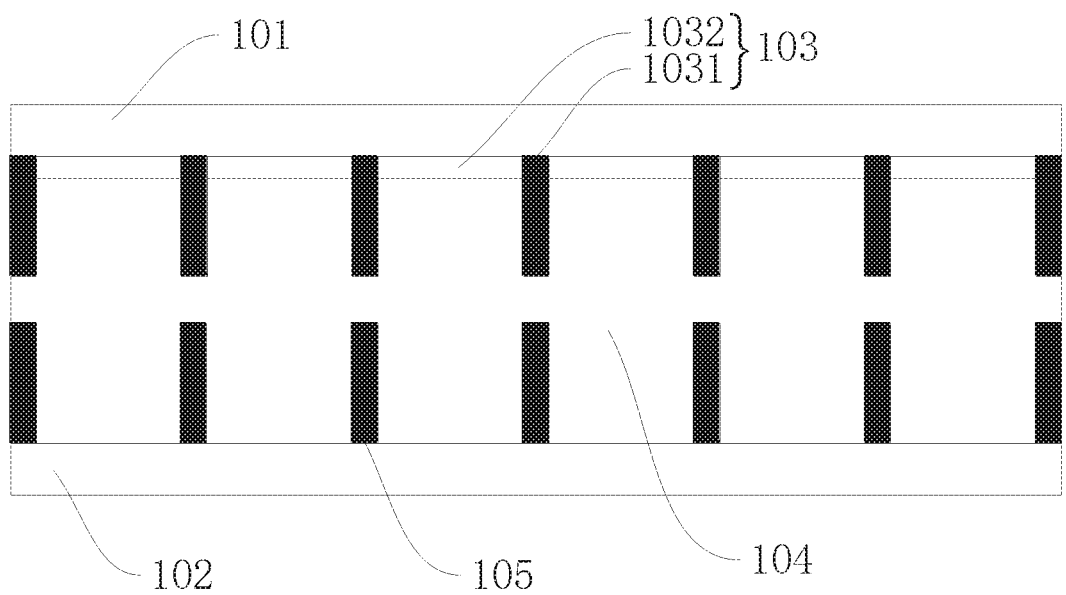
FIG. 2 is a schematic structural diagram of another display panel provided by one embodiment of the present disclosure.

In another embodiment of the present disclosure, please refer to FIG. 2, the difference between this embodiment and the above embodiment is that: a plurality of second black color resist blocks 105 are disposed on a side of the array substrate 102 facing the color filter substrate 101, and the plurality of second black color resist blocks 105 and the plurality of first black color resist blocks 1031 are in a one-to-one correspondence, which block and absorb the scattered light in the liquid crystal layer 104, prevent the scattered light from entering adjacent pixels, improve a controllability of the light transmittance rate of the adjacent pixels, and improve the contrast and color gamut of the display panel.

In this embodiment, each of the plurality of second black color resist blocks 105 has an interval from the corresponding first black color resist block 1031, and a height of each of the plurality of second black color resist blocks 105 can be equal to the height of the corresponding first black color resist block 1031, and a height of each of the plurality of first black color resist blocks 1031 and each of the plurality of second black color resist blocks 105 can be between 6 μm to 20 μm, the heights of the plurality of first black color resist blocks 1031 and the plurality of second black color resist blocks 105 are adjusted according to a thickness of the liquid crystal layer 104, so as to coordinate the transmittance rate and contrast of the display panel, thereby can improve the contrast of the display panel while ensuring light transmittance rate.

In summary, by increasing the heights of the plurality of first black color resist block and disposing the plurality of second black color resist blocks 105 on the array substrate in this embodiment, to block and absorb the scattered light in the liquid crystal layer, and reduces the scattered light enter the adjacent color resist block, thereby can improve the problem that the scattered light affects the adjacent pixels, and thus reducing a difference between the transmittance rate of adjacent pixels and the theoretical value, so as to achieve the purpose of improving the contrast and the color gamut of the display panel.

In addition, one embodiment of the present disclosure further provides a display device, and the display device includes the display panel as described in the above embodiment, and the structure is the same as in the above embodiment, which is not repeated here. The display device may include a backlight module, the backlight module is disposed on one side of the display panel, which may also be a side of the display panel, thereby can further enhance the effect of displaying objects in a transparent display when the display device is applied to display transparently.

In summary, by increasing the heights of the plurality of first black color resist block to block and absorb the scattered light in the liquid crystal layer of the display device of the embodiment of the present disclosure, the scattered light can be prevented from entering the adjacent color resist block, thereby improving the contrast and the color gamut of the display device, especially when the display device is used in transparent displays, because of the polymer network liquid crystal is used in the liquid crystal layer, the display device of the embodiment of the present disclosure can improve the transmittance rate while improving the contrast and the color gamut of the display panel, thereby can improve the display effect.

In the above embodiments, the description of each embodiment has its own emphasis. For a part that is not detailed in one embodiment, the related descriptions of other embodiments can be referred.

The display panel and display device provided by the embodiments of the present disclosure have been described in detail above. Specific embodiments have been used in the descriptions to explain the principles and implementation of the present disclosure. The descriptions of the above embodiments are only used to help understand technical solutions and core ideas of the present disclosure; those of ordinary skill in the art should understand that they can still modify the technical solutions described in the foregoing embodiments, or equivalently replace some of the technical features; However, these modifications or substitutions do not deviate corresponding technical solutions from the scope of the technical solutions of the embodiments of the present disclosure.

What is claimed is:

1. A display panel, comprising:
an array substrate; and
a color filter substrate disposed opposite to the array substrate, wherein a color filter layer is disposed on a side of the color filter substrate facing the array substrate, and the color filter layer comprises a plurality of first black color resist blocks arranged at intervals and a plurality of color resist blocks disposed between two adjacent first black color resist blocks, wherein a height of each of the plurality of first black color resist blocks is greater than a height of each of the plurality of color resist blocks;
wherein a plurality of second black color resist blocks are disposed on a side of the array substrate facing the color filter substrate, and the second black color resist blocks are aligned correspondingly with the first black color resist blocks, respectively;
wherein each of the second black color resist blocks has an interval between the second black color resist block and a corresponding one of the first black color resist blocks.

2. The display panel as claimed in claim 1, wherein the height of each of the plurality of first black color resist blocks are greater than or equal to 6 microns.

3. The display panel as claimed in claim 2, wherein the height of each of the plurality of first black color resist blocks are less than or equal to 20 microns.

4. The display panel as claimed in claim 1, wherein each of the plurality of color resist blocks is independently selected from one of a red color resist block, a green color resist block, a blue color resist block, or a white color resist block.

5. The display panel as claimed in claim 1, wherein the array substrate is provided with a plurality of gate lines and a plurality of data lines that cross each other, the plurality of gate lines and the plurality of data lines defining a plurality of sub-pixel regions arranged in an array, each of the plurality of sub-pixel regions is provided with a pixel electrode and a photosensitive sensor, and two terminals of the photosensitive sensor are respectively connected to a scanning line and the pixel electrode.

6. The display panel as claimed in claim 1, wherein a liquid crystal layer is further provided between the array substrate and the color filter substrate, and wherein the liquid crystals in the liquid crystal layer comprise polymer network liquid crystals.

7. The display panel as claimed in claim 1, wherein the color filter substrate is further provided with a protective layer on a side facing the color filter layer, and the protective layer covers the color filter layer.

8. A display device comprising a display panel and a backlight module provided on a side of the display panel, and the display panel comprising:
an array substrate; and
a color filter substrate disposed opposite to the array substrate, wherein a color filter layer is disposed on a side of the color filter substrate facing the array substrate, and the color filter layer comprises a plurality of first black color resist blocks arranged at intervals and a plurality of color resist blocks disposed between two adjacent first black color resist blocks, wherein a height of each of the plurality of first black color resist blocks is greater than a height of each of the plurality of color resist blocks;
wherein a plurality of second black color resist blocks are disposed on a side of the array substrate facing the color filter substrate, and the second black color resist blocks are aligned correspondingly with the first black color resist blocks, respectively;
wherein each of the second black color resist blocks has an interval between the second black color resist block and a corresponding one of the first black color resist blocks.

9. The display device as claimed in claim 8, wherein the height of each of the plurality of first black color resist blocks are greater than or equal to 6 microns.

10. The display device as claimed in claim 9, wherein the height of each of the plurality of first black color resist blocks are less than or equal to 20 microns.

11. The display device as claimed in claim 8, wherein each of the plurality of color resist blocks is independently selected from one of a red color resist block, a green color resist block, a blue color resist block, or a white color resist block.

12. The display device as claimed in claim 8, wherein the array substrate is provided with a plurality of gate lines and a plurality of data lines that cross each other, the plurality of gate lines and the plurality of data lines defining a plurality of sub-pixel regions arranged in an array, each of the plurality of sub-pixel regions is provided with a pixel electrode and a photosensitive sensor, and two terminals of the photosensitive sensor are respectively connected to a scanning line and the pixel electrode.

13. The display device as claimed in claim 8, wherein a liquid crystal layer is further provided between the array substrate and the color filter substrate, and wherein liquid crystals in the liquid crystal layer comprise polymer network liquid crystals.

14. The display device as claimed in claim 8, wherein the color filter substrate is further provided with a protective layer on a side facing the color filter layer, and the protective layer covers the color filter layer.

\* \* \* \* \*